United States Patent
Tamai

[19]
[11] Patent Number: 6,107,725
[45] Date of Patent: Aug. 22, 2000

[54] VIBRATION TYPE DRIVING DEVICE AND APPARATUS USING THE SAME

[75] Inventor: Jun Tamai, Yokohama, Japan

[73] Assignee: Canon Kabushiki Kaisha, Tokyo, Japan

[21] Appl. No.: 09/055,880

[22] Filed: Apr. 7, 1998

[30] Foreign Application Priority Data

Apr. 8, 1997 [JP] Japan ................................. 9-089627

[51] Int. Cl.$^7$ .................................................. H02N 2/00
[52] U.S. Cl. ................................ 310/323.11; 310/323.15
[58] Field of Search .......................... 310/323.11, 323.15

[56] References Cited

U.S. PATENT DOCUMENTS

| | | | |
|---|---|---|---|
| 4,580,073 | 4/1986 | Okumura et al. | 310/323 |
| 4,779,018 | 10/1988 | Okuno et al. | 310/323.11 |
| 4,939,404 | 7/1990 | Inagki et al. | 310/323.11 |
| 5,122,700 | 6/1992 | Tamai et al. | 310/323 |
| 5,124,611 | 6/1992 | Tamai et al. | 310/317 |
| 5,231,325 | 7/1993 | Tamai et al. | 310/323 |
| 5,440,191 | 8/1995 | Takagi | 310/323.11 |
| 5,506,462 | 4/1996 | Tamai et al. | 310/328 |
| 5,508,581 | 4/1996 | Saya et al. | 310/323.11 |
| 5,574,326 | 11/1996 | Chiba et al. | 310/323 |
| 5,594,291 | 1/1997 | Tamai et al. | 310/323 |
| 5,600,196 | 2/1997 | Tamai | 310/323 |
| 5,684,353 | 11/1997 | Fujimoto et al. | 310/323 |
| 5,760,529 | 6/1998 | Tamai et al. | 310/323 |

FOREIGN PATENT DOCUMENTS

| | | | |
|---|---|---|---|
| 59-201685 | 11/1984 | Japan | F16H 27/02 |
| 1-30473 | 2/1989 | Japan | 310/323.11 |
| 1-248975 | 10/1989 | Japan | 310/323.11 |
| 4-21373 | 1/1992 | Japan | 310/323.11 |
| 5-211785 | 8/1993 | Japan | H02N 2/00 |
| 5-252767 | 9/1993 | Japan | H02N 2/00 |
| 2 217 925 | 11/1989 | United Kingdom | 310/323.11 |

*Primary Examiner*—Thomas M. Dougherty
*Attorney, Agent, or Firm*—Fitzpatrick, Cella, Harper & Scinto

[57] ABSTRACT

A vibration type driving device includes a vibration element by which vibration is excited, and a contact element brought into contact with the vibration element and relatively moved by the vibration. One of two opposing slide portions of the vibration and contact elements is made of an alumina ceramic containing an additive except alumina, and the other one of the two opposing slide portions is made of an iron-based material. An apparatus using this vibration type driving device is also disclosed.

15 Claims, 6 Drawing Sheets

| SAMPLE NO. | MATERIAL (wt. %) | HARDNESS (Hv) | REFERENCE |
|---|---|---|---|
| 1 | SiC | 2000 | |
| 2 | SiC | 2800 (SiC), 1000 (Si) | TWO PHASE STRUCTURE |
| 3 | TiC | 2600 | CVD |
| 4 | TiNx | 2200 | CVD |
| 5 | TiCN | 1500 | |
| 6 | SiNx | 1600 | |
| 7 | AℓN | 1400 | |
| 8 | TiB2 | 2200 | |
| 9 | ZrO2 | 1400 | |
| 10 | SIALON | 1700 | |
| 11 | Aℓ2O3 99.5% | 1500 | VOID RATE IS 10% |
| 12 | Aℓ2O3 99.9% | 1900 | VOID RATE IS LOWER THAN 1% |
| 13 | Aℓ2O3 99.99% | 2300 | VOID RATE IS LOWER THAN 1% |
| 14 | Aℓ2O3+1% Si | 1200 | |
| 15 | Aℓ2O3+50% ZrO2 | 1200 | |
| 16 | Aℓ2O3+10% TiC | 1700 | |
| 17 | Aℓ2O3+10% Y2O3 | 1500 | |
| 18 | Aℓ2O3+10% SiC | 1600 | |
| 19 | Aℓ2O3+10% SiC | 1500 | WHISKER TYPE SiC |
| 20 | Aℓ2O3+10% KTiO | 1400 | WHISKER TYPE KTiO |
| 21 | Aℓ2O3+10% TiOx | 1400 | WHISKER TYPE TiOx |
| 22 | Aℓ2O3+10% AℓBx | 1400 | WHISKER TYPE AℓBx |
| 23 | SUPER HARD 88% WC+Co | 2200 (WC), 400 (Co) | |

| SAMPLE NO. | MATERIAL (wt. %) | HARDNESS (Hv) | REFERENCE |
|---|---|---|---|
| 1 | SiC | 2000 | TWO PHASE STRUCTURE |
| 2 | SiC | 2800 (SiC), 1000 (Si) | CVD |
| 3 | TiC | 2600 | CVD |
| 4 | TiNx | 2200 | |
| 5 | TiCN | 1500 | |
| 6 | SiNx | 1600 | |
| 7 | AℓN | 1400 | |
| 8 | TiB2 | 2200 | |
| 9 | ZrO2 | 1400 | |
| 10 | SIALON | 1700 | |
| 11 | Aℓ2O3 99.5% | 1500 | VOID RATE IS 10% |
| 12 | Aℓ2O3 99.9% | 1900 | VOID RATE IS LOWER THAN 1% |
| 13 | Aℓ2O3 99.99% | 2300 | VOID RATE IS LOWER THAN 1% |
| 14 | Aℓ2O3+1% Si | 1200 | |
| 15 | Aℓ2O3+50% ZrO2 | 1200 | |
| 16 | Aℓ2O3+10% TiC | 1700 | |
| 17 | Aℓ2O3+10% Y2O3 | 1500 | |
| 18 | Aℓ2O3+10% SiC | 1600 | |
| 19 | Aℓ2O3+10% SiC | 1500 | WHISKER TYPE SiC |
| 20 | Aℓ2O3+10% KTiO | 1500 | WHISKER TYPE KTiO |
| 21 | Aℓ2O3+10% TiOx | 1400 | WHISKER TYPE TiOx |
| 22 | Aℓ2O3+10% AℓBx | 1400 | WHISKER TYPE AℓBx |
| 23 | SUPER HARD 88% WC+Co | 2200 (WC), 400 (Co) | |

FIG. 4

| SAMPLE NO. | MATERIAL | HARDNESS (Hv) | REFERENCE |
|---|---|---|---|
| 1 | JIS SUS304 | 160 | |
| 2 | JIS SUS301 | 500 | STRAIN AGING TREATMENT |
| 3 | JIS SUS420j2 | 650 | QUENCH AND TEMPER TREATMENT |
| 4 | JIS SUS631 | 550 | PRECIPITATION HARDENING TREATMENT |
| 5 | JIS SK4 | 800 | QUENCH AND TEMPER TREATMENT |
| 6 | INCONEL 750 | 400 | |
| 7 | JIS SUS420j2 | 190 | ANNEALING |

FIG. 5

| TEST NO. | *1 FIG. 3 | *2 FIG. 4 | ABRASION LOSS OF THE MATERIAL SHOW IN FIG. 3 ($\mu$m) | ABRASION LOSS OF THE MATERIAL SHOW IN FIG. 4 ($\mu$m) | EVALUATION |
|---|---|---|---|---|---|
| 1 | 1 | 3 | 60 | 0 | × |
| 2 | 2 | 3 | 50 | 0 | × |
| 3 | 3 | 3 | 22 | 0 | × |
| 4 | 4 | 3 | 32 | 0 | × |
| 5 | 5 | 3 | 20 | 0 | × |
| 6 | 6 | 3 | 22 | 0 | × |
| 7 | 7 | 3 | 5 | 0 | △ |
| 8 | 8 | 3 | 8 | 0 | △ |
| 9 | 9 | 3 | 36 | 0 | × |
| 10 | 10 | 3 | 15 | 0 | × |
| 11 | 11 | 3 | FRACTUATED | 15 | × |
| 12 | 12 | 3 | FRACTUATED | 12 | × |
| 13 | 13 | 3 | PIN HOLES ARE GENERATED | 0 | — |
| 14 | 14 | 3 | 0.5 | 0 | ◎ |
| 15 | 15 | 3 | 1 | 0 | ◎ |
| 16 | 16 | 3 | 0.3 | 0 | ◎ |
| 17 | 17 | 3 | 0.3 | 0 | ◎ |
| 18 | 18 | 3 | 0.2 | 0 | ◎ |
| 19 | 19 | 3 | 0.5 | 0 | ◎ |
| 20 | 20 | 3 | 0.2 | 0 | ◎ |
| 21 | 21 | 3 | 0.7 | 0 | ◎ |
| 22 | 22 | 3 | 0.5 | 0 | ◎ |
| 23 | 23 | 3 | 85 | 10 | × |
| 24 | 13 | 6 | PIN HOLES ARE GENERATED | 70 | × |
| 25 | 19 | 1 | 1 | 5 | ◎ |
| 26 | 19 | 2 | 0.6 | 2 | ◎ |
| 27 | 19 | 4 | 0.3 | 0 | ◎ |
| 28 | 19 | 5 | 0.1 | 0 | ◎ |
| 29 | 19 | 6 | 3 | 55 | × |
| 30 | 23 | 6 | 47 | 65 | × |
| 31 | 19 | 7 | 0.3 | 3 | ◎ |

*1 THE NUMERAL MEANS THE SAMPLE NO. IN FIG. 3 USED AS A FRICTIONAL MATERIAL ON THE VIBRATION ELEMENT

*2 THE NUMERAL MEANS THE SAMPLE NO. IN FIG. 4 USED AS A FRICTIONAL MATERIAL ON THE MOVING ELEMENT

FIG. 6

VIBRATION TYPE DRIVING DEVICE AND APPARATUS USING THE SAME

BACKGROUND OF THE INVENTION

1. Field of the Invention

The present invention relates to a vibration type driving device in which a vibration element and a contact element brought into contact with the vibration element are moved relative to each other by vibration generated in the vibration element.

2. Related Background Art

Figure 6:
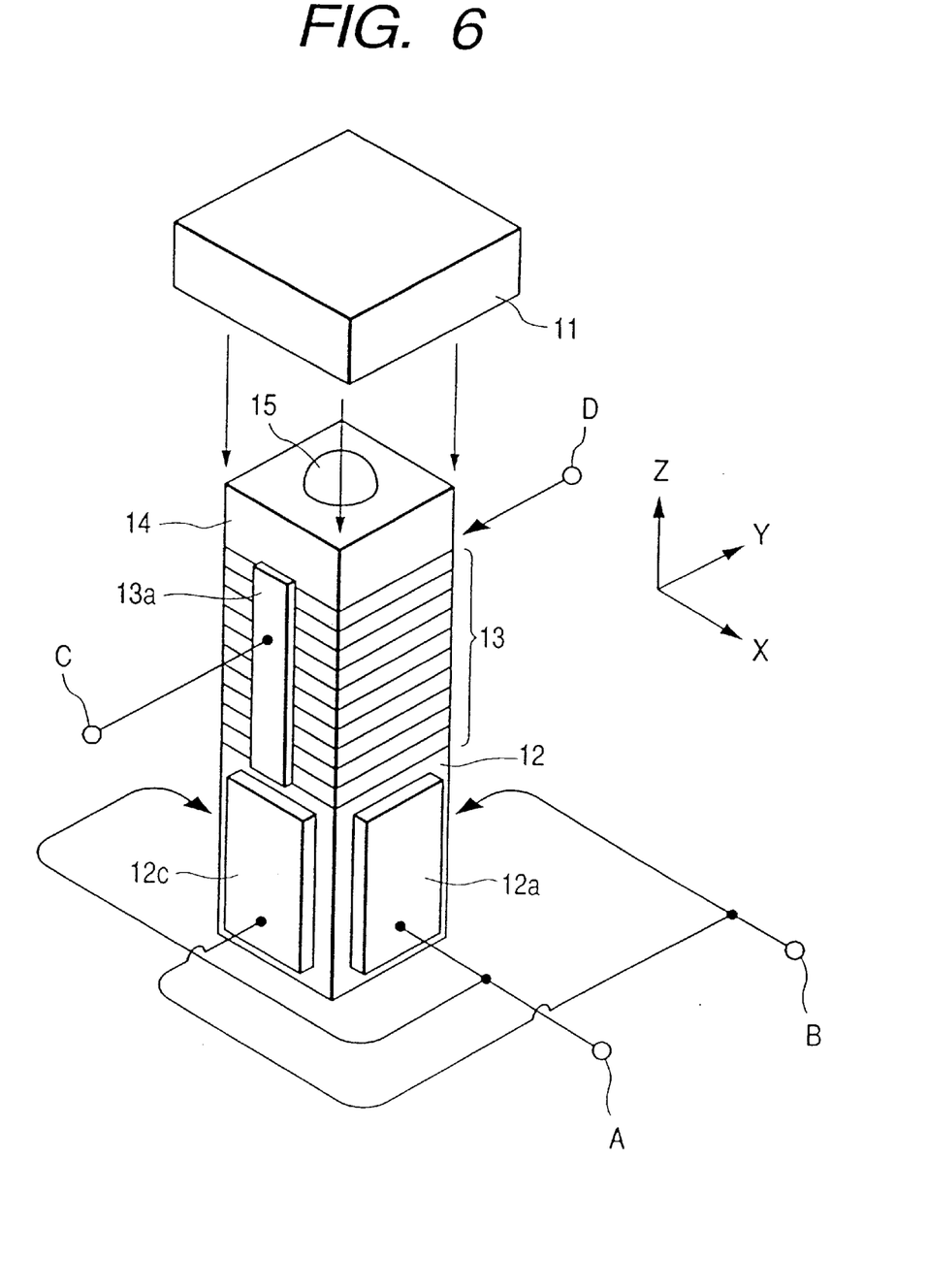
FIG. 6 is a perspective view showing a conventional vibration motor.

A conventional vibration type driving device (vibration motor) is proposed in, e.g., Japanese Patent Application Laid-Open No. 5-252767. As shown in FIG. 6, this motor synthesizes the bending vibration generated by piezoelectric elements 12a and 12c and the expansion-shrinkage vibration generated by a stacked piezoelectric element 13 to generate elliptic motion in a frictional member 15. A driven element (contact element) 11 contacting the frictional member 15 is moved. The frictional member 15 is made of a steel material, while the driven element 11 is made of a ceramic material such as alumina.

In the above motor, the frictional member 15 contacts and receives an impact at the same position, while the contact position of the driven element 11 constantly changes. For this reason, the driven element 11 can be made of a ceramic poor in toughness and fatigue strength. When ceramic is used in a traveling wave vibration motor whose slide portion repeatedly receives impact, an alumina-based ceramic material tends to fail and any other ceramic material greatly abrades.

SUMMARY OF THE INVENTION

One aspect of the invention is to attain a long service life in a vibration type driving device by forming one of two opposing slide portions of a vibration element and a contact element using an alumina ceramic material containing an additive and the other of the two opposing slide portions using an iron-based material.

The above and other objects, features, and advantages of the present invention will be apparent from the following detailed description of the preferred embodiments taken in conjunction with the accompanying drawings.

DESCRIPTION OF THE PREFERRED EMBODIMENTS

An embodiment will exemplify a vibration type driving device for relatively sliding a vibration element whose vibration is excited by electro-mechanical energy conversion and a contact element contacting this vibration element, wherein one of two opposing slide portions of the vibration and contact elements is made of an alumina ceramic material containing an additive (the content is 1 wt. % or more) except alumina, and the other of the two opposing slide portions is made of an iron-based material.

According to our study, abrasion forms of hard materials maybe classified into two types when hard materials such as an oxide-based ceramic, a nitride-based ceramic, a carbide-based ceramic, a boride-based ceramic, or a carbide-based material are used as the material for the sliding portion, if stainless steel, or a nickel-based heat-resistant material is used as the mating sliding portion.

One type of abrasion is chemical abrasion found in silicon carbide or the like. According to an experiment, silicon carbide having a Vickers hardness of 2,000 or more was abraded. In this case, the silicon carbide was smoothly abraded, while the stainless steel of the mating sliding portion was abraded little. If the ceramic material has a low abrasion loss, a smooth surface always appears on the slide surface thereof, and performance (torque generation) of the actuator is stable and desirable. However, an actuator having a long service life cannot be obtained.

This abrasion can be explained by a principle (mechano-chemical effect) in which a silicon wafer having a Vickers hardness of 1,000 or more can be polished with a material (e.g., $BaCO_3$, $CaCO_3$, or $Fe_3O_4$) having a hardness lower than that of the silicon wafer. This effect is probably accounted for by conversion of the surface of silicon carbide into $SiO_2$ by frictional heat or the like, and subsequent removal of the $SiO_2$. This effect is confirmed in materials not containing Si, such as $Mo_2C$, WC, $TiB_2$, TaC, or TiC as well.

On the other hand, the above abrasion forms are rarely observed in alumina. Upon driving for a long period of time, a hole was formed in the surface of alumina and the alumina then failed within a relatively short period of time. The period until this failure occurred was longer for alumina materials having higher strengths. An alumina material originally having voids (low density) failed in an early stage. Perhaps, this is attributed to fatigue failure due to the lack of toughness.

According to an embodiment based on the above findings, an alumina ceramic is used as one frictional material, and 1 wt. % or more of a material which accelerates chemical abrasion of the alumina ceramic and prevents stress concentration is added to the alumina ceramic. An additive which causes slight chemical abrasion is added to the alumina to form a softer film than the alumina matrix on the surface of the base material. This can increase the actual contact area (true contact surface), and prevent stress concentration and failure of alumina. A preferable example of the additive is silicon, silicon carbide, zirconia, titanium carbide, potassium titanate, yttrium oxide, titanium oxide, or aluminum borate. This additive causes chemical abrasion in a very small amount. An additive which exhibits an effect only in a large amount is not preferable because the volume of this additive increases. Most of the above additives themselves have a hardness lower than that of alumina. The addition of these additives does not lead to lower strength of the base material and these additives have low phase boundary strengths with alumina. This makes the strength of alumina containing an additive lower than that of pure alumina. Therefore, an additive which exhibits an effect in a very small amount is preferable.

Silicon carbide, potassium titanate, titanium oxide, or aluminum borate is preferably contained in the form of a whisker to increase the strength and toughness of alumina, thereby preventing destructive abrasion of alumina and providing a vibration driving device having a long service life.

As the mating material, hard stainless steel such as martensite stainless steel or precipitation hardening type stainless steel having a Vickers hardness of 500 or more is preferably used because it is almost free from abrasion.

First Embodiment

Figure 1A:
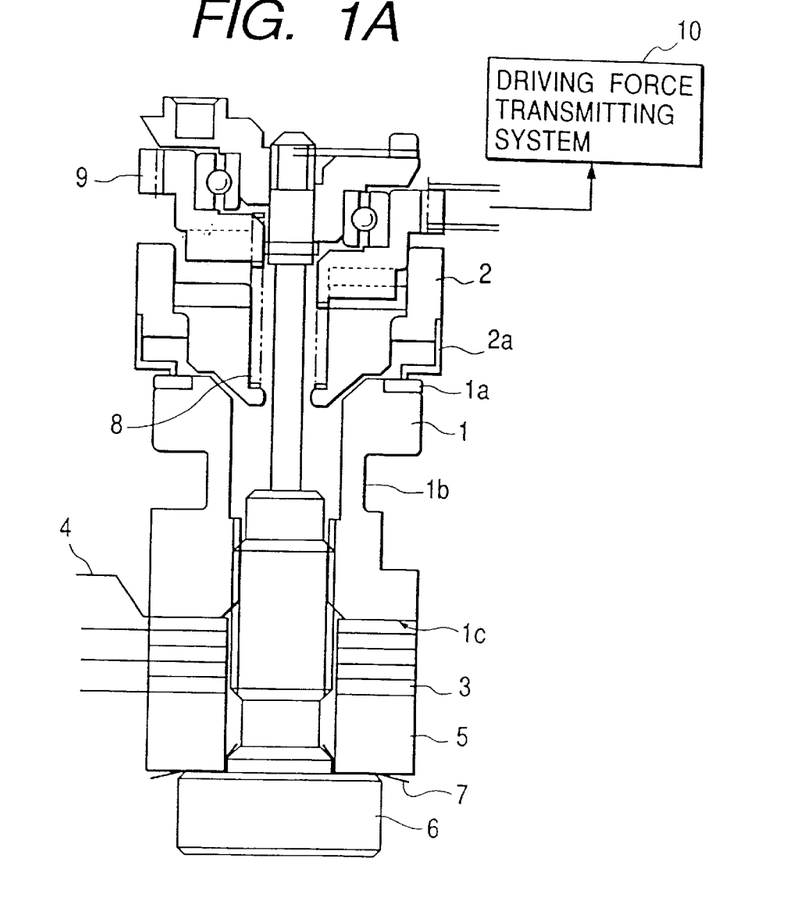
FIGS. 1A and 1B are a side view and a partial enlarged view, respectively, of a bar-like vibration motor according to the first embodiment of the present invention.
Figure 1B:
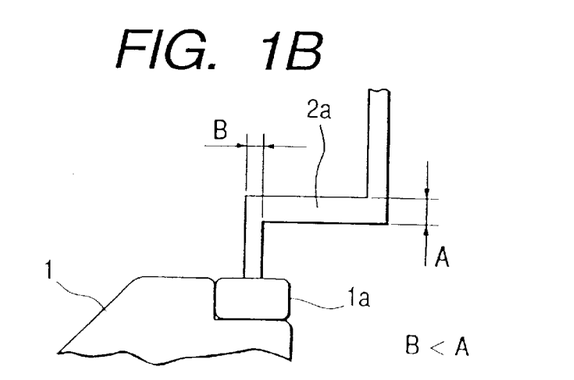

FIGS. 1A and 1B show a bar-like vibration motor (vibration type driving device) according to the first embodiment of the present invention. This motor includes a vibration element 1 and a stacked piezoelectric element 3 contacting a lower end face 1c of the vibration element 1. The stacked piezoelectric element 3 serves as an electromechanical energy conversion element. The stacked piezoelectric element 3 is pressed against the lower end face 1c of the vibration element 1 by the fastening force of a shaft 6 through a ring member 5. A hard frictional member 1a is formed on the upper end of the vibration element 1.

A moving element (contact element) 2 is rotatable about the shaft 6. A metal frictional member 2a is formed in the lower portion of the moving element 2. As shown in FIG. 1B in detail, the lower end portion of the metal frictional member 2a is pressed against the hard frictional member 1a by the above fastening force. An output member 9 engages with the moving element 2 so as to rotate together with the moving element 2. The gear unit of the output member 9 meshes with the gear of a driving force transmitting system 10 such as a copying machine serving as an apparatus. The actuation principle of this bar-like vibration motor is described in Japanese Patent Application Laid-Open No. 5-211785 (U.S. patent application Ser. No. 08/340,469), and a detailed description thereof will be omitted. In summary, an RF alternating electrical signal is applied to the piezoelectric element to excite vibration of the vibration element 1, and the moving element 2 is rotated by the friction between the hard frictional member 1a and the metal frictional member 2a.

Figure 3:
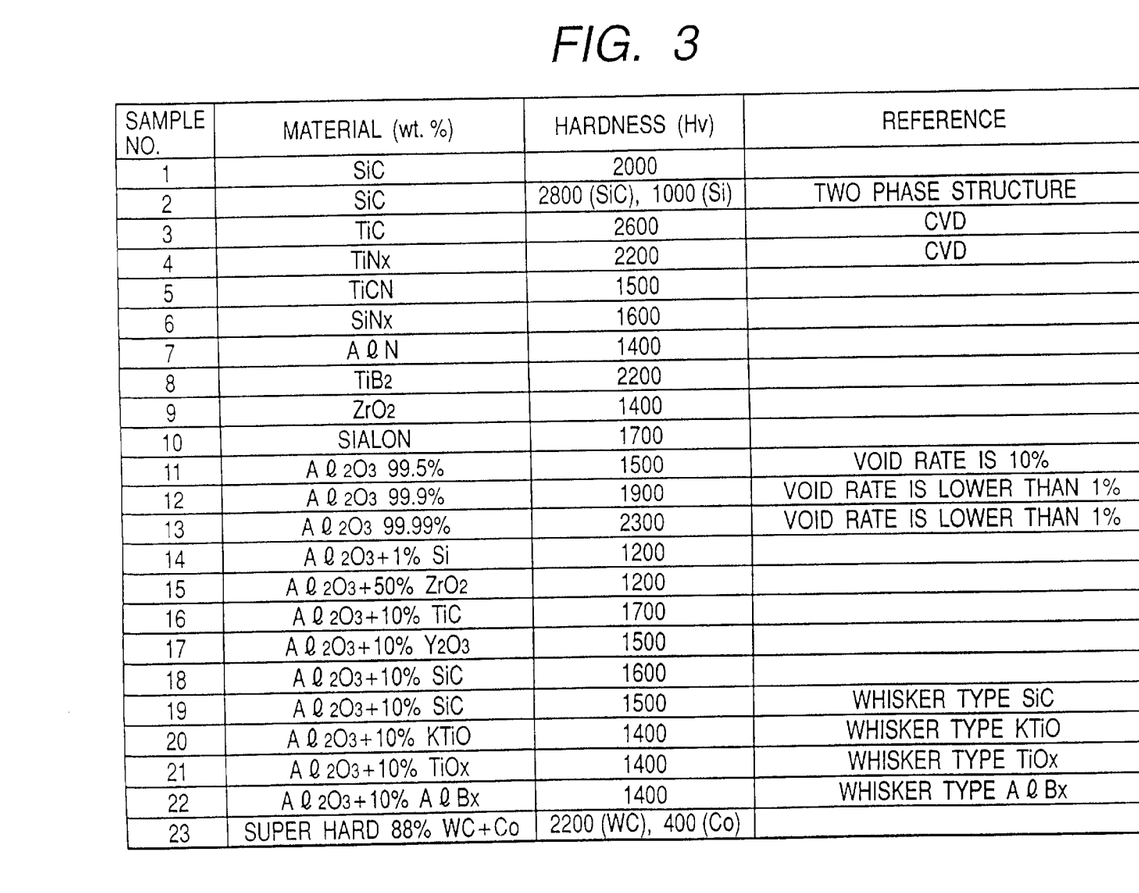
FIG. 3 is a table showing frictional materials for the vibration elements of the respective embodiments.
Figure 4:
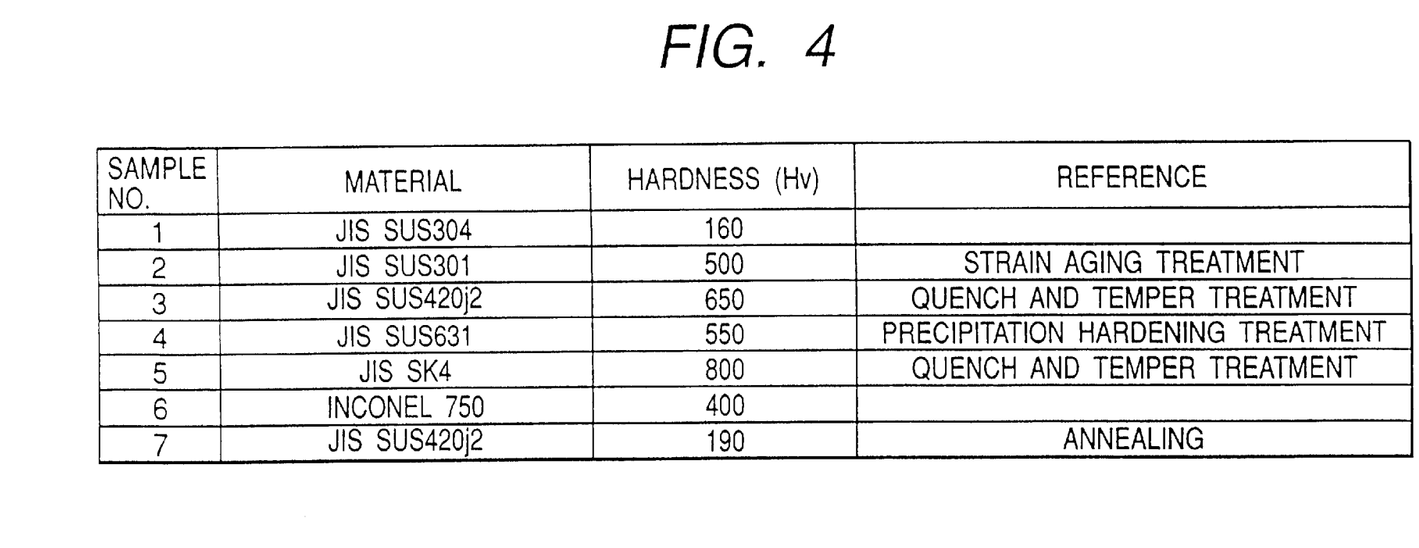
FIG. 4 is a table showing frictional materials for the moving elements of the respective embodiments.

As the hard frictional member 1a, the materials shown in FIG. 3 are prepared. Each of these materials is formed into a ring by machining such as cylindrical grinding, surface grinding, wire cutting, or laser cutting, and the resultant frictional member is joined to the vibration element 1 with an epoxy adhesive or by brazing. On the other hand, as the metal frictional member 2a, the materials shown in FIG. 4 are prepared. Each of the metal thin plates made of these materials is drawn and wiped (pressed) to obtain a stepped cylinder. That portion of the cylinder which contacts the slide portion is made smaller in wall thickness by wiping than the remaining portion. This shape contributes to an increase in dynamic rigidity and improvement in the follow-up characteristics of the moving element 2 with respect to the vibration element 1, thereby preventing so-called squeaking.

Figure 5:
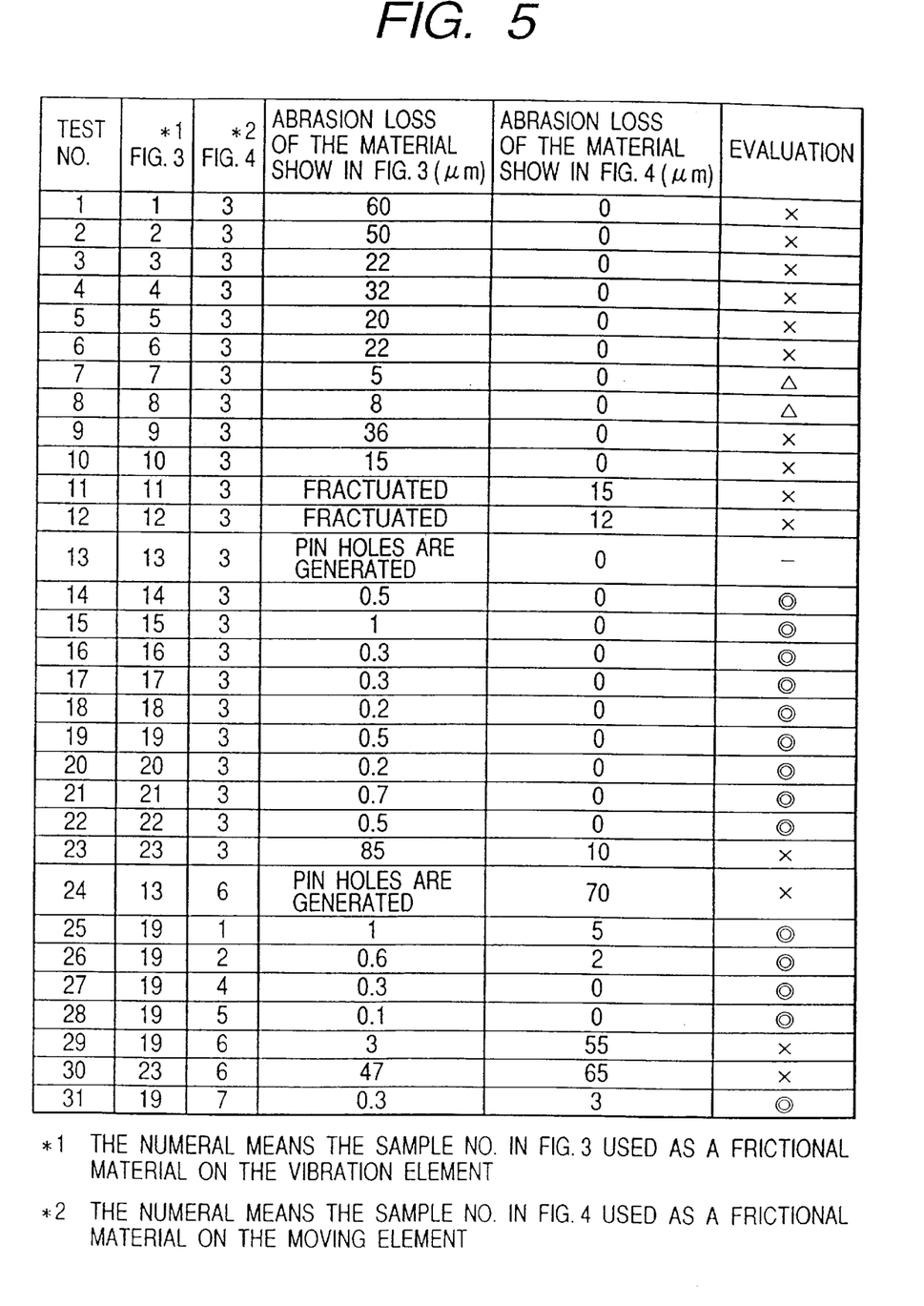
FIG. 5 is a table showing evaluation results of the above frictional materials.

The frictional members whose materials were shown in FIGS. 3 and 4 were combined to prepare samples as shown in FIG. 5, and the following tests were conducted to evaluate the respective frictional members. Each test was run using the bar-like vibration motor shown in FIGS. 1A and 1B, the surface pressure perpendicularly acting on the frictional surface was set to 4 MPa, and the speed of the moving element 2 was set to 900 rpm. This speed corresponds to 0.4 m/sec as the relative speed between the frictional members 1a and 2a. The load torque was set to $2 \times 10^{-3}$ N·m (0.5N tangential force acting on the frictional surface).

When the motor was rotated for 100 hours (sliding distance: 144 km), a sample in which the frictional member 1a of the vibration element 1 or the frictional member 2a of the moving element 2 was abraded 10 μm or more was evaluated as "x" in FIG. 5; a sample in which the frictional member 2a of the moving element 2 was abraded 10 μm or less, and the frictional member 1a of the vibration element 1 was abraded in the range of 1 to 10 μm, as "Δ"; and a sample in which the frictional member 2a of the moving element 2 was abraded 10 μm or less, and the frictional member 1a of the vibration element 1 was abraded in the range of 1 μm or less, as "⊚". Note that an accurate abrasion loss of the frictional member 1a of each vibration element 1 is required because otherwise a track forms on the frictional member 1a and the motor performance suffers more with increasing depth of the track.

As shown in FIG. 5, chemical abrasion occurred in the frictional members 1a of the vibration elements 1 of test Nos. 1 to 10. These frictional members 1a did not fail, but smoothly abraded. Generation of abrasion particles in small amounts is the fact common to these frictional members. When Ni-P-Si abraded 10 μm in a conventional combination of Ni-P-Si was and an anodized film (tradename: Alumite), black abrasion particles were generated in a large amount. These particles were interposed between the frictional surfaces to reduce the motor torque, thereby causing rotational irregularity. Note that abrasion particles were rarely confirmed in silicon carbide although it was abraded 50 to 60 μm.

Commercially available alumina materials were used for the frictional members 1a of the vibration elements of test Nos. 11 to 13. The alumina material in test No. 11 failed from the corners of voids because it had a high void rate. The surface of the alumina material in test No. 12 failed although it had a low void rate. The alumina material in test No. 13 did not fail, which is perhaps simply due to the limited test time. More specifically, when the durability test was continued for test No. 13, the alumina material failed in about 150 hours. Also, abrasion abruptly progressed once the material failed. This is possibly a result of fatigue failure of the alumina material. When the load torque is reduced, the time until this failure occurs may be prolonged. However, the decrease in load torque results in a drawback of the motor because high torque is the best characteristic feature of this motor. The following two measures are available to improve the fracture strength in alumina subjected to frictional contact.

1. It is very important to prevent stress concentration in a material such as alumina, which is a brittle material. The mechanism of relaxing the stress due to sliding deformation cannot be expected in alumina unlike a metal. The surface of the alumina can be coated with a soft material having a ductility higher than the alumina matrix. When such a material film formed on the surface in the post-treatment abrades, only a life time of about 150 hours is expected even for the alumina material used in test No. 13.

A component can be contained in alumina so as to produce a soft film. According to this technique, new soft films can be sequentially generated by the so-called self-generating action. The soft film has a low Young's modulus or a low deformation resistance. For this reason, the soft film can increase the contact area and prevent stress concentration.

2. The toughness of alumina itself is improved to increase the fatigue strength. For this purpose, whisker type fibers can be contained in alumina. A whisker material itself more preferably exhibits effect 1 described above. The progress in cracking can be prevented by high-strength fibers.

The samples in test Nos. 14 to 18 exhibited effect 1. The samples in test Nos. 19 to 22 exhibited effect 2.

Super hard 88% WC+Co was used for the frictional member 1a of the vibration element 1 in test No. 23. This material has a two phase structure consisting of polygonal tungsten carbide having a Vickers hardness of 2,000 or more and soft cobalt which bonds tungsten carbide. This super hard material abraded in an amount larger than the mating stainless steel material. In addition, the abraded surface of the super hard material was smooth as if it were lapped. When the surface was observed with a scanning electron microscope, hardly any step was confirmed between the hard WC phase and the soft Co phase. The abrasion particles were finer than the WC and Co phases and rounded. These abrasion particles were aggregated. This indicates that the super hard material is not abraded upon fracture, but is abraded by a chemical action.

A pure alumina material which exhibited good results and a small abrasion loss with the mating stainless steel material was used in test No. 24. In this case, the mating material was INCONEL 750 as a nickel-based heat-resistant alloy. Heat-resistant materials are generally excellent in strength at high temperatures (e.g., creep strength) and do not form an oxidation progressive scale. Therefore, a heat-resistant material is assumed to be optimal as a frictional member when a frictional sliding surface is heated to high temperatures. However, the INCONEL side greatly abraded in practice.

The nature of the oxide film changes depending on the matrices. For example, SK4 (high-carbon steel) in sample No. 5 of FIG. 4 generally produces ferric oxide ($Fe_2O_3 \rightarrow$ hematite). Since the diffusion coefficient of iron in this film is large, the film tends to grow and becomes thick upon corroding the matrix. On the other hand, chromium is contained in stainless steel, and a very thin chromium oxide film 10 nm or less thick is formed nearest to the matrix. This film is called a passivation film in which iron atoms tend not to diffuse. For this reason, ferric oxide tends not to grow, and the oxide film on the surface is always kept thin. The above heat-resistant material can be kept thin to high temperatures. That is, the thicknesses of the films were assumed to be in the order of carbon steel>stainless steel>heat-resistant material in the frictional state. The adhesion strength of stainless steel is higher than that of carbon steel. This allows metal coagulation in the heat-resistant material, and abrasion abruptly progresses. The growth and elimination of scales are repeated in carbon steel. Therefore, abrasion in a relatively large amount may be observed as in test No. 28. By contrast, stainless steel probably always has an oxide film having an appropriate thickness. When annealed SUS420J2 was used as the mating material as in test No. 31, the abrasion loss was higher than the use of hard SUS420J2. This may be because the resistance to plastic deformation of the matrix slightly influences the abrasion loss.

Judging from the above experimental results, the following choices are appropriate. That is, the hard frictional material 1a most preferably consists of a material obtained by adding, to an alumina ceramic, 1 wt. % or more of silicon, silicon carbide, zirconia, titanium carbide, potassium titanate, yttrium oxide, titanium oxide, or aluminum borate. The metal frictional member 2a most preferably consists of martensite-based stainless steel (SUS420J2), precipitation and hardening type stainless steel (SUS631) or high-carbon steel (SK4).

Second Embodiment

Figure 2A:
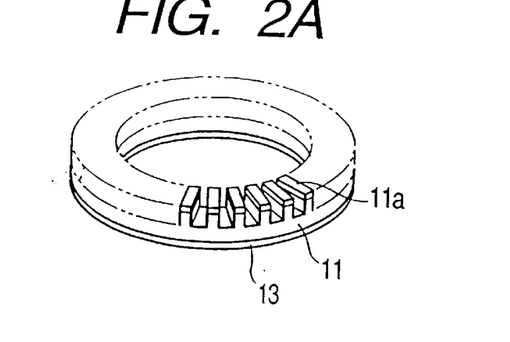
FIGS. 2A, 2B and 2C are views for explaining a ring type vibration motor according to the second embodiment of the present invention.
Figure 2B:
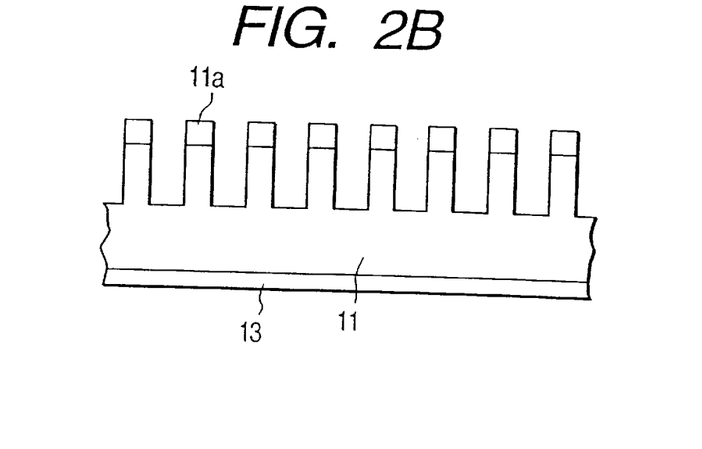
Figure 2C:
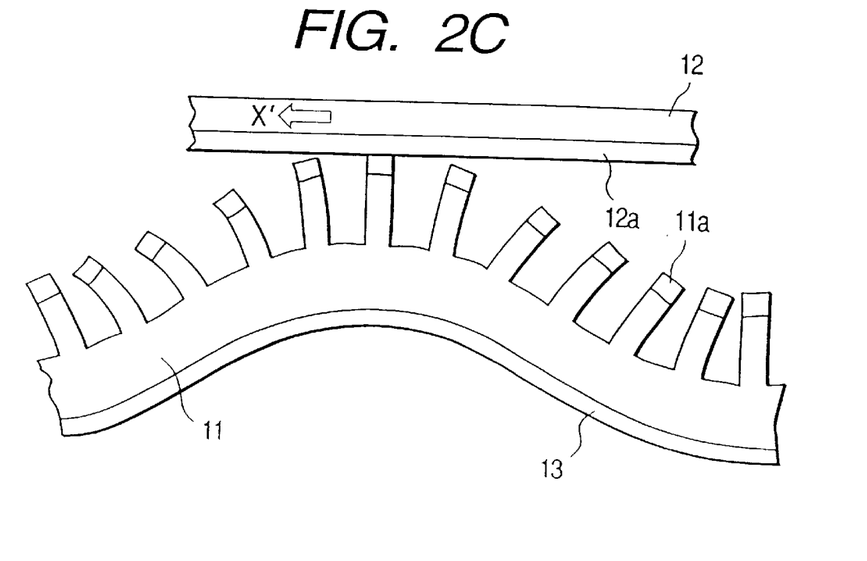

FIGS. 2A to 2C show a ring type vibration motor according to the second embodiment of the present invention. The principle of driving this vibration motor is known in, e.g., Japanese Patent Application Laid-Open No. 59-201685 (U.S. Pat. No. 4,580,073) and will be briefly described below. Referring to FIGS. 2A to 2C, this motor comprises a vibration element 11 which has a large number of projections at a predetermined interval in the circumferential direction. A frictional member 11a is joined to the distal end of each projection, i.e., a slide portion. In this embodiment, the material in sample No. 19 shown in FIG. 3 is used for the frictional member 11a. The material in sample No. 19 is an alumina ceramic containing an SiC whisker. This material is cut with a laser to conform to the shape of the distal end face, and the cut piece is adhered to the corresponding projection with an epoxy adhesive, or brazed to the projection with solder or the like. The frictional member 11a may be obtained by pressing a sheet formed by doctor blade molding and sintering the pressed piece.

A moving element 12 as in the first embodiment is brought into contact with each projection of the vibration element 11. Stainless steel as a frictional member 12a is bonded to the moving element 12. An electro-mechanical energy conversion element 13 is bonded to the vibration element 11. The conversion element 13 receives an alternating voltage and generates a traveling vibration wave on the projections of the vibration element 11. The moving element 12 is pressed in contact with the vibration element 11 upon reception of a pressure from a pressurizing means (not shown). As a result, the moving element 12 receives a frictional driving force to rotate. This motion is relatively generated through the frictional force. When the vibration element 11 is kept stationary, the moving element 12 rotates, and vice versa.

In the above embodiment, an SiC whisker-containing alumina material was used for the frictional material 11a of the vibration element 11, and stainless steel was used for the frictional member 12a of the moving element 12. Any material may be used if it is evaluated as "⊚" of FIG. 5 in the first embodiment. In the motor of this type, since the frictional member 12a of the moving element comes into contact with the ridge of each ceramic piece, an alumina material having a toughness higher than that of the first embodiment and almost free from cracks is preferably used.

In each embodiment described above, a hard frictional member is bonded to a vibration element, and a metal frictional member is bonded to a moving element. However, the present invention is also applicable when a hard frictional member is bonded to a moving element and a metal frictional member is bonded to a vibration element.

As has been described above, an alumina ceramic is used as the material of one of the slide portions of the vibration and contact elements, and an additive for promoting chemical abrasion and preventing stress concentration is added to this alumina ceramic. A film softer than the alumina matrix can be formed on the surface to increase the area of the actual contact portion (true contact surface). This prevents stress concentration and prevents alumina failure, thereby increasing the service life of the vibration type driving device.

In addition, an additive which can obtain the above effect in a small content is selected. Therefore, an increase in volume of the additive and a decease in strength of alumina itself can be prevented.

When a whisker type additive is contained therein, the strength and toughness of the alumina can be increased to prevent destructive abrasion of the alumina, thereby increasing the service life of the vibration type driving device.

What is claimed is:

1. A vibration type driving device comprising:

a vibration element in which vibration is excited, said vibration element having a slide portion; and a contact element having a slide portion contactable with the slide portion of said vibration element, said vibration element and said contact element being movable relative to each other by the vibration, wherein one of the slide portion of said vibration element and the slide portion of said contact element is made of an alumina ceramic containing an additive other than alumina, and the other one of the slide portion of said vibration element and the slide portion of said contact element is made of an iron-based material.

2. A device according to claim 1, wherein the amount of said additive contained in the alumina ceramic is not less than 1 wt. %.

3. A device according to claim 1, wherein said additive is at least one material selected from the group consisting of silicon, silicon carbide, zirconia, titanium carbide, potassium titanate, yttrium oxide, titanium oxide, and aluminum borate.

4. A device according to claim 2, wherein said additive is at least one material selected from the group consisting of silicon, silicon carbide, zirconia, titanium carbide, potassium titanate, yttrium oxide, titanium oxide, and aluminum borate.

5. A device according to claim 3, wherein said additive is a wisker-type of at least one material selected from the group of silicon carbide, potassium titanate, titanium oxide, and aluminum borate.

6. A device according to claim 4, wherein said additive is a wisker-type of at least one material selected from the group of silicon carbide, potassium titanate, titanium oxide, and aluminum borate.

7. A device according to claim 1, wherein said iron-based material is one material selected from the group consisting of martensite-based stainless steel having a Vickers hardness of not less than 500 and precipitation and hardening type stainless steel having a Vickers hardness of not less than 500.

8. A device according to claim 4, wherein said iron-based material is one material selected from the group consisting of martensite-based stainless steel having a Vickers hardness of not less than 500 and precipitation and hardening type stainless steel having a Vickers hardness of not less than 500.

9. A device according to claim 6, wherein said iron-based material is one material selected from the group consisting of martensite-based stainless steel having a Vickers hardness of not less than 500 and precipitation and hardening type stainless steel having a Vickers hardness of not less than 500.

10. An apparatus using an output from a vibration type driving device as a driving source, said vibration type driving device including:

a vibration element in which vibration is excited, said vibration element having a slide portion; and a contact element having a slide portion contactable with the slide portion of said vibration element, said vibration element and said contact element being movable relative to each other by the vibration, wherein one of the slide portion of said vibration element and the slide portion of said contact element is made of an alumina ceramic containing an additive other than alumina, and the other one of the slide portion of said vibration element and the slide portion of said contact element is made of an iron-based material.

11. An apparatus according to claim 10, wherein said additive is at least one material selected from the group consisting of silicon, silicon carbide, zirconia, titanium carbide, potassium titanate, yttrium oxide, titanium oxide, and aluminum borate.

12. An apparatus according to claim 11, wherein said additive is a wisker-type of at least one material selected from the group of silicon carbide, potassium titanate, titanium oxide, and aluminum borate.

13. An apparatus according to claim 10, wherein said iron-based material is one material selected from the group consisting of martensite-based stainless steel having a Vickers hardness of not less than 500 and precipitation and hardening type stainless steel having a Vickers hardness of not less than 500.

14. An apparatus according to claim 11, wherein said iron-based material is one material selected from the group consisting of martensite-based stainless steel having a Vickers hardness of not less than 500 and precipitation and hardening type stainless steel having a Vickers hardness of not less than 500.

15. An apparatus according to claim 12, wherein said iron-based material is one material selected from the group consisting of martensite-based stainless steel having a Vickers hardness of not less than 500 and precipitation and hardening type stainless steel having a Vickers hardness of not less than 500.

* * * * *

UNITED STATES PATENT AND TRADEMARK OFFICE
CERTIFICATE OF CORRECTION

PATENT NO. : 6,107,725

DATED : August 22, 2000

INVENTOR(S) : Jun Tamai

It is certified that error appears in the above-identified patent and that said Letters Patent is hereby corrected as shown below:

COLUMN 3:

Line 43, "machining" should read --machining,--.

COLUMN 4:

Line 21, "abraded" should read --was abraded--.

Line 21, "was" should be deleted.

Line 50, "alumina" should read --alumina,--.

Line 54, "life time" should read --lifetime--.

COLUMN 6:

Line 63, "decease" should read --decrease--.

COLUMN 7:

Line 31, "wisker-type" should read --whisker-type--.

Line 35, "wisker-type" should read --whisker-type--.

UNITED STATES PATENT AND TRADEMARK OFFICE
CERTIFICATE OF CORRECTION

PATENT NO. : 6,107,725

DATED : August 22, 2000

INVENTOR(S) : Jun Tamai

It is certified that error appears in the above-identified patent and that said Letters Patent is hereby corrected as shown below:

COLUMN 8:

Line 26, "wisker-type" should read --whisker-type--.

Signed and Sealed this

Twenty-ninth Day of May, 2001

Attest:

NICHOLAS P. GODICI

*Attesting Officer*  *Acting Director of the United States Patent and Trademark Office*